United States Patent
Etemad et al.

(10) Patent No.: US 8,811,258 B2
(45) Date of Patent: Aug. 19, 2014

(54) ENHANCED LOCAL COMMUNICATIONS IN MOBILE BROADBAND NETWORKS

(71) Applicant: Intel Corporation, Santa Clara, CA (US)

(72) Inventors: Kamran Etemad, Potomac, MD (US); Yujian Zhang, Beijing (CN); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 13/719,372

(22) Filed: Dec. 19, 2012

(65) Prior Publication Data

US 2014/0003320 A1    Jan. 2, 2014

Related U.S. Application Data (60) Provisional application No. 61/624,185, filed on Apr. 13, 2012.

(51) Int. Cl.
    *H04H 20/71*    (2008.01)
    *H04W 4/06*     (2009.01)
    *H04W 72/00*    (2009.01)
    *H04W 88/02*    (2009.01)

(52) U.S. Cl.
    CPC ............ *H04W 72/005* (2013.01); *H04W 4/06* (2013.01); *H04W 88/02* (2013.01)
    USPC ........................................................ 370/312

(58) Field of Classification Search
    None
    See application file for complete search history.

(56) References Cited

U.S. PATENT DOCUMENTS

| | | | |
|---|---|---|---|
| 7,450,534 B2 * | 11/2008 | Kim et al. | 370/312 |
| 7,646,762 B2 * | 1/2010 | Cai et al. | 370/352 |
| 7,864,722 B2 * | 1/2011 | Yi et al. | 370/312 |
| 2004/0151133 A1 * | 8/2004 | Yi et al. | 370/312 |
| 2009/0207771 A1 | 8/2009 | Lindskog et al. | |
| 2010/0110960 A1 * | 5/2010 | Kim et al. | 370/312 |
| 2010/0302988 A1 * | 12/2010 | Becker | 370/312 |
| 2010/0322131 A1 | 12/2010 | Song et al. | |

(Continued)

FOREIGN PATENT DOCUMENTS

| WO | 2006/136992 A2 | 12/2006 |
|---|---|---|
| WO | 2013/095355 A1 | 6/2013 |

OTHER PUBLICATIONS

International Search Report and Written Opinion received for Patent Application No. PCT/US2013/036468, mailed on Jul. 29, 2013, 10 pages.

(Continued)

*Primary Examiner* — Clemence Han
(74) *Attorney, Agent, or Firm* — Stoel Rives LLP (57) ABSTRACT

The techniques introduced herein provide a framework for efficient communication to, and among, a local communication group (LCG). The LCG may be a peer-to-group communication or a network-to-group communication. The peer-to-group communication may be one way (e.g., one peer in the group may send communications to the rest of the users with little feedback) or two way (e.g., each member of the group may have the ability to share content with the remaining members of the group). According to the techniques introduced herein, local group communication may be anchored through an eNodeB of an LTE network, which may use a combination of multicast communications in the downlink and unicast communications in the uplink.

22 Claims, 9 Drawing Sheets

(56) References Cited

U.S. PATENT DOCUMENTS

| | | |
|---|---|---|
| 2011/0013574 A1 | 1/2011 | Hsu |
| 2011/0044223 A1* | 2/2011 | Kim et al. .................... 370/312 |
| 2011/0286377 A1* | 11/2011 | Sampath et al. ............. 370/312 |
| 2012/0002583 A1 | 1/2012 | Kong et al. |
| 2012/0039233 A1* | 2/2012 | Kim et al. .................... 370/312 |
| 2013/0148563 A1* | 6/2013 | Brueck et al. ................ 370/312 |
| 2013/0286918 A1* | 10/2013 | Park et al. .................... 370/311 |
| 2014/0003319 A1* | 1/2014 | Etemad ......................... 370/312 |

OTHER PUBLICATIONS

3GPP TS 23.246, 3rd Generation Partnership Project; Technical Specification Group Services and System Aspects; Multimedia Broadcast/Multicast Service {MBMS}; Architecture and functional description {Release 11), V11.1.0 (Mar. 2012), 66 pages.

* cited by examiner

ENHANCED LOCAL COMMUNICATIONS IN MOBILE BROADBAND NETWORKS

CROSS-REFERENCE TO RELATED APPLICATION

This application claims the benefit under 35 U.S.C. §119 (e) of U.S. Provisional Application No. 61/624,185, filed Apr. 13, 2012, which is hereby incorporated by reference herein in its entirety.

BACKGROUND

In the past few decades, mobile communication systems employing an orthogonal frequency-division multiplexing (OFDM) digital modulation scheme have increased. One such communication system, for example, are networks operating under the Universal Mobile Telecommunications System (UMTS) Long Term Evolution (LTE) standard, initiated by the third-generation partnership project (3GPP). LTE networks include new radio access technology and core radio network architecture that provide high data rate, low latency, packet optimization, and improved system capacity and coverage. In LTE networks, an evolved universal terrestrial radio access network (EUTRAN) includes a plurality of evolved Node-Bs (eNodeBs) and communicates with a plurality of mobile terminals, also referred to as user equipments (UEs). A downlink (DL) transmission in a LTE network can be defined as a communication from the eNodeB to a UE, and an uplink (UL) transmission can be defined as a communication from the UE to the eNodeB. In a downlink transmission, the eNodeB can communicate with a single UE with a unicast subframe using a unicast service. Alternatively, the eNodeB can communicate with a plurality of UEs with a multicast/broadcast single-frequency network (MBSFN) subframe using a multimedia broadcast multicast service (MBMS).

BRIEF DESCRIPTION OF THE DRAWINGS

One or more embodiments of the present disclosure are illustrated by way of example and not limited by the figures of the accompanying drawings, in which like references indicate similar elements.

DETAILED DESCRIPTION

There are various applications and use cases proposed in 3GPP which may involve network initiated or UE initiated communication to or among a group of users and/or devices. For example, peer-to-peer or device to device (D2D) communications among a group of users and/or devices have been proposed for local social networks, content sharing, location based marketing, serving advertisements, mobile to mobile applications, public safety, etc. Previous attempts to implement such local communication groups (LCGs) have relied on direct device to device communication and are therefore sensitive to proximity between devices. This limited range has resulted in previous attempts to be limited in scale.

Therefore, a need exists for a system and method for conducting local group communication in a way that is not sensitive to the pairwise close proximity of all the users in the group.

The techniques introduced herein provide a framework for efficient communication to, and among, an LCG. According to various embodiments, the LCG may be a peer-to-group communication or a network-to-group communication. The peer-to-group communication may be one way (e.g., one peer in the group may send communications to the rest of the users with little feedback) or two way (e.g., each member of the group may have the ability to share content with the remaining members of the group). According to the techniques introduced herein, local group communication may be anchored through an eNodeB of an LTE network, which may use a combination of multicast communications in the downlink and unicast communications in the uplink. These communications and other details are described in more detail below.

References in this specification to "an embodiment," "one embodiment," or the like, mean that the particular feature, structure or characteristic being described is included in at least one embodiment of the present disclosure. Occurrences of such phrases in this specification do not necessarily all refer to the same embodiment.

Figure 1:
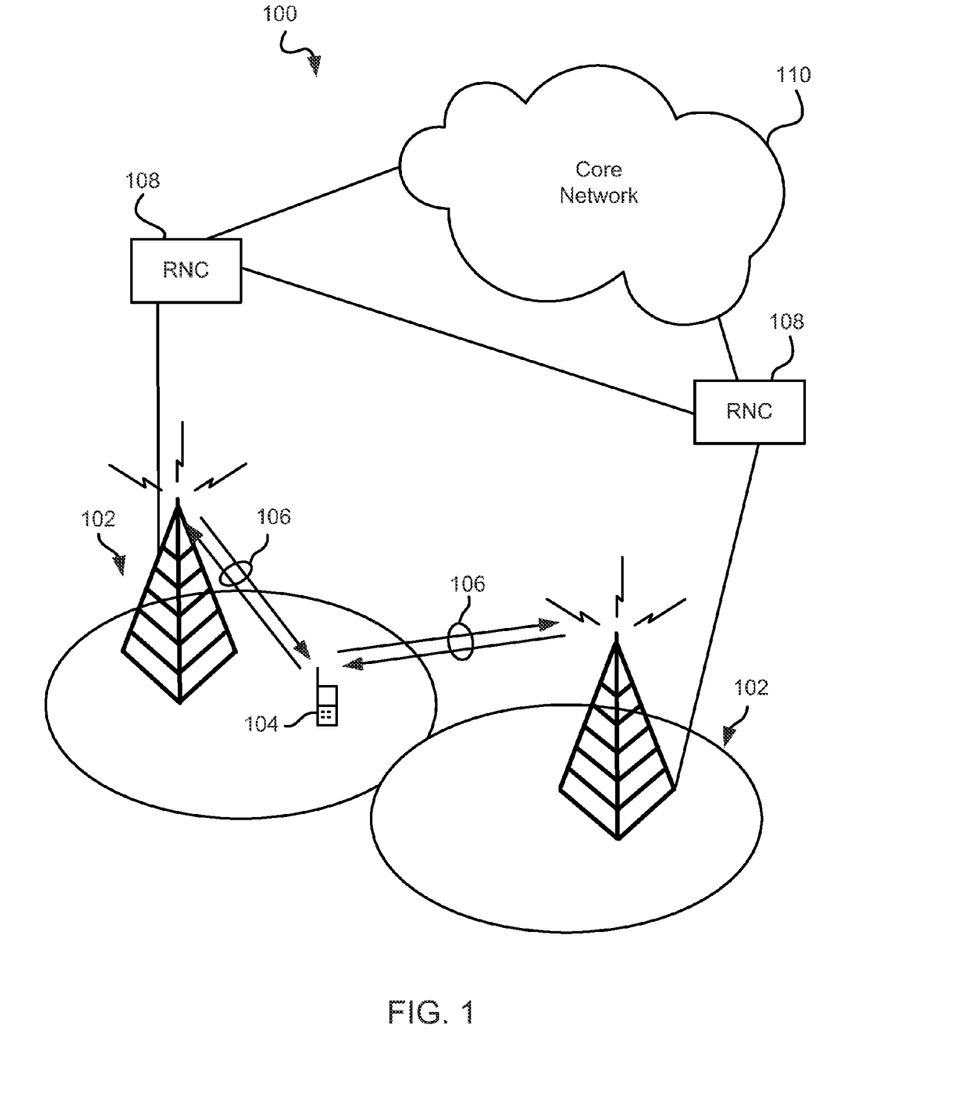
FIG. 1 illustrates an example architecture of a cellular network.

FIG. 1 illustrates an example architecture of a cellular network 100. The example network includes base stations 102 and a mobile terminal 104 (also referred to herein as "user equipment" or "UE"). The term "base station" as used herein is a generic term. As will be appreciated by those skilled in the art, in an Evolved Universal Terrestrial Radio Access Network (EUTRAN), such as one used in the LTE architecture, the base station 102 may be an evolved NodeB (eNodeB). However, the term "eNodeB" is also broader in some senses than the conventional base station since the eNodeB refers, in general, to a logical node. The term "base station" as used herein is inclusive of a base station, a NodeB, an eNodeB or other nodes specific for other architectures. An eNodeB in an LTE system can handle transmission and reception in one or several cells.

The mobile terminal 104 uses a dedicated channel 106 to communicate with the base station 102, e.g., by transmitting or receiving radio link control (RLC) protocol data unit (PDU) segments and service data unit (SDU) segments according to example embodiments described below. The base station 102 is connected to a corresponding radio network controller (RNC) 108. Although not shown as such in FIG. 1, it will be appreciated that each RNC 108 may control more than one base station 102. The RNC 108 is connected to a core network 110. In the LTE architecture, the core network 110 is an evolved packet core (EPC).

As introduced above, the EUTRAN is a wireless communication network using the air interface defined by the 3GPP's LTE standards. EUTRAN is also referred to as the 3GPP work item on the Long Term Evolution and the evolved universal terrestrial radio access (EUTRA) in early drafts of the 3GPP LTE specification. The EUTRAN is a radio access network standard meant to replace the UMTS, high-speed downlink packet access (HSDPA), and high-speed uplink packet access (HSUPA) technologies specified in 3GPP releases 5 and beyond. EUTRAN provides higher data rates, lower latency, and is optimized for packet data.

Figure 2:
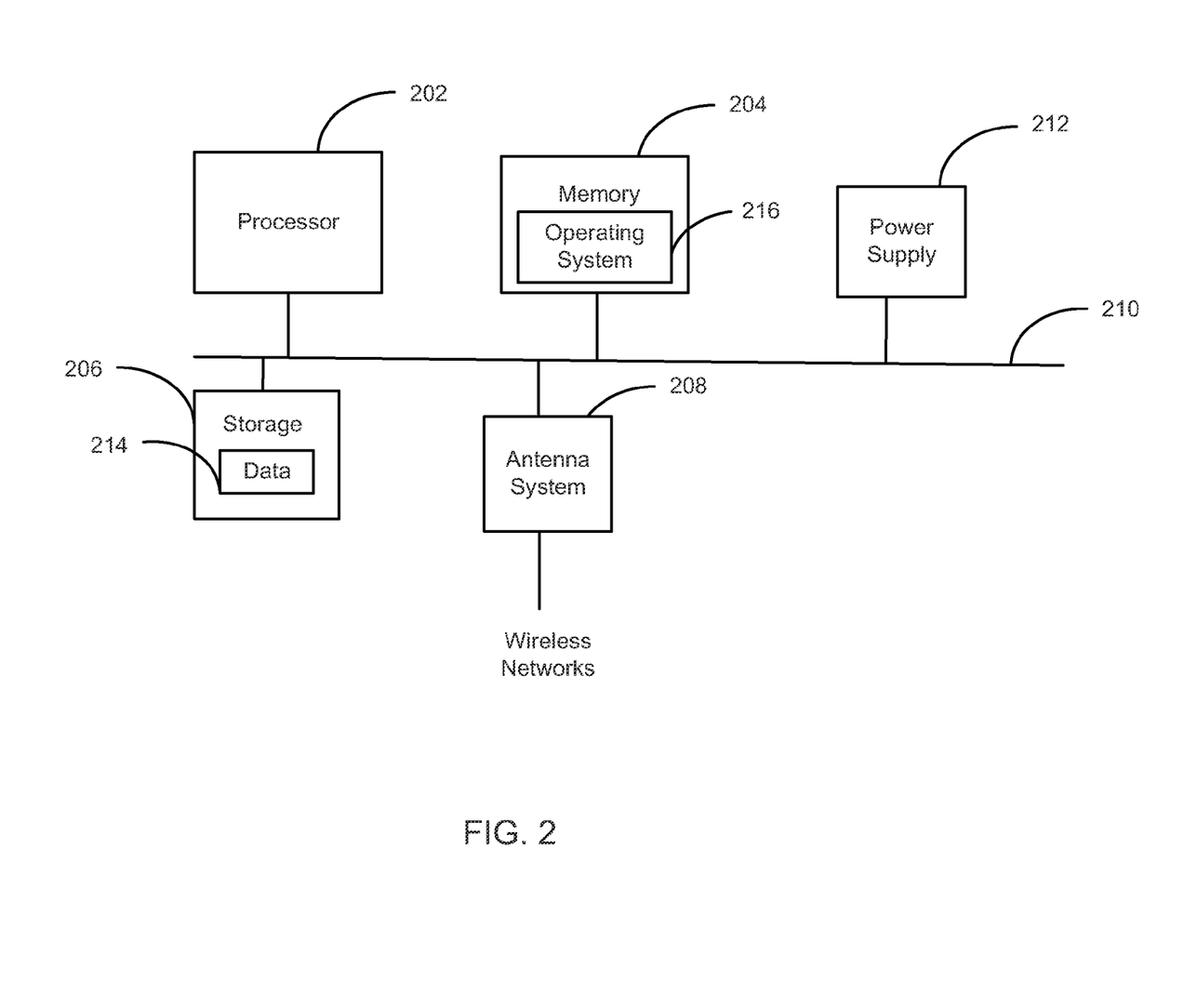
FIG. 2 is a high-level block diagram showing an example of the architecture of a base station.

FIG. 2 is a high-level block diagram showing an example of the architecture of a base station, for example base station 102. In the illustrated embodiment, the base station architecture is a processing system that includes a processor subsystem 202 that can include one or more processors. The base station architecture further includes a memory 204, a storage module 206, and an antenna system 208, each interconnected by an interconnect 210 and powered by a power supply 212.

The base station architecture can be embodied as a single- or multi-processor system that preferably implements a high-level module to send and receive data to and from a mobile terminal, for example, mobile terminal 104. The data is communicated via the antenna system 208, which can include a single antenna or multiple antenna system capable of receiving and transmitting data on one or more frequencies. The data 214 can be stored in the storage module 206 so that it can be retrieved by the processor subsystem 202 and memory 204.

The memory 204 illustratively comprises storage locations that can be addressed by the processor subsystem 202 and the base station architecture's other components for storing software program code and data structures. The processor subsystem 202 and the associated components may, in turn, include processing elements and/or logic circuitry configured to execute the software code and manipulate the data structures. The operating system 216, portions of which may be resident in memory 204 and executed by the processor subsystem 202, functionally organizes the base station architecture by, among other things, establishing a connection between each of the UEs 104 and the eNodeB 102 and transmitting and receiving data. It will be apparent to those skilled in the art that other processing and memory implementations, including various computer readable storage media, may be used for storing and executing program instructions pertaining to the technique introduced herein.

Figure 3A:
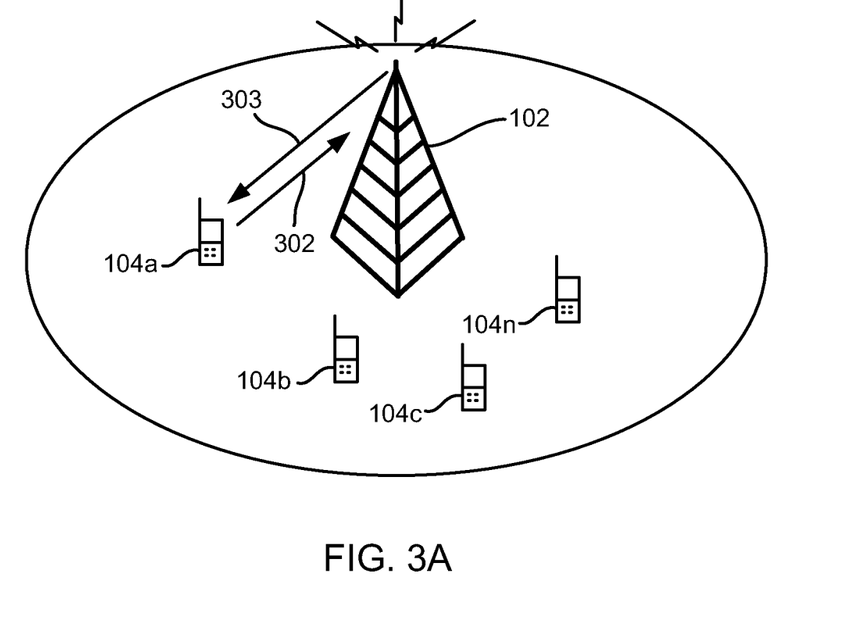
FIGS. 3A and 3B illustrate an example eNodeB implementing a local communication group.

FIG. 3 illustrates an example eNodeB implementing a local communication group. As shown in FIG. 3A, a UE 104a of a plurality of UEs 104a-104n, sends a request 302 to create an LCG to the eNodeB 102. In one embodiment, the request to create an LCG may be sent in response to an application layer instruction in the UE 104a. In addition to the request to create the LCG, the request may include quality of service (QoS) related information. In response to the request, the eNodeB 102 may provide a group ID 303 associated with the LCG to the UE 104a and set up a radio bearer with a corresponding quality class identifier (QCI) for the uplink and downlink communications associated with the group ID. The process for establishing the communication is described in more detail below. The group management and configuration may also be carried out by another entity in the network if multicasting is to be coordinated across multiple cells.

Once the UE 104a has received the group ID from the eNodeB 102, the UE 104a may transmit an invitation including the group ID to the other UEs 104b-104n to be included in the LCG. In addition to the group ID, the invitation may include other information, such as application layer encryption keys, if data is to be encrypted, and a start time of communications for the LCG, for example. In another embodiment, the additional information is sent only to those UEs 104b-104n that accept the invitation and join the LCG. The invitation signaling may be carried out in the application layer with no special handling by the network.

In one embodiment, the eNodeB 102 maintains a list of UEs included in the LCG. The list may indicate which UEs are allowed to transmit messages in the uplink to be communicated to the rest of the UEs in the LCG. This list may be modifiable by the creator of the LCG, for example, UE 104a, or the eNodeB 102 at any time before or during communications of the LCG. In some embodiments, the list may include a logical channel identifier (LCID) and logical channel group identifier (LCGID) for each of the UEs 104a-104n in the LCG. After the eNodeB 102 has formed a group, eNodeB 102 may set up logical channels for uplink communications from each UE 104a-104n in the group and assign LCIDs for each of these logical channels through radio resource control (RRC) signaling. In one embodiment, each UE 104a-104n is associated with a corresponding unique LCID. For example, the list may include an LCID-a corresponding to UE 104a and a LCID-n corresponding to UE 104n. In another embodiment, the list may include a single LCID associated with all of the UEs 104a-104n. The LCID may be either a "real" LCID with a value of 00001-01010 (e.g., as can be found in Table 6.2.1-2 of TS 36.321 published by 3GPP) or a reserved LCID that may be exclusively used for uplink transmissions associated with local group communications.

The LCID may be used to identify communications from a UE 104a-104c that are intended for the LCG. For example, when UE 104a requests an uplink connection to communicate to the LCG, eNodeB 102 may set up one logical channel in the uplink (e.g., LCID-a) associated with UE 104a and the LCG to which UE 104a belongs. In addition, assuming there is another UE 104n allowed to send transmissions in the uplink, eNodeB 102 can set up one logical channel in the uplink (e.g., LCID-n) associated with UE 104n and the LCG. As noted above, LCID-a and LCID-n can be the same or distinct IDs. When UE 104a sends data in the uplink, the UE 104a may include LCID-a in the communication (e.g., using an LCID field in the medium access control (MAC) header). Upon receipt, eNodeB 102 will associate the received transmission with the LCG based on the presence of LCID-a in the communication. Similarly, when UE 104n sends data in the uplink, the UE 104n may include LCID-n in the communication and eNodeB 102 will also associate the transmission with the LCG.

Figure 3B:
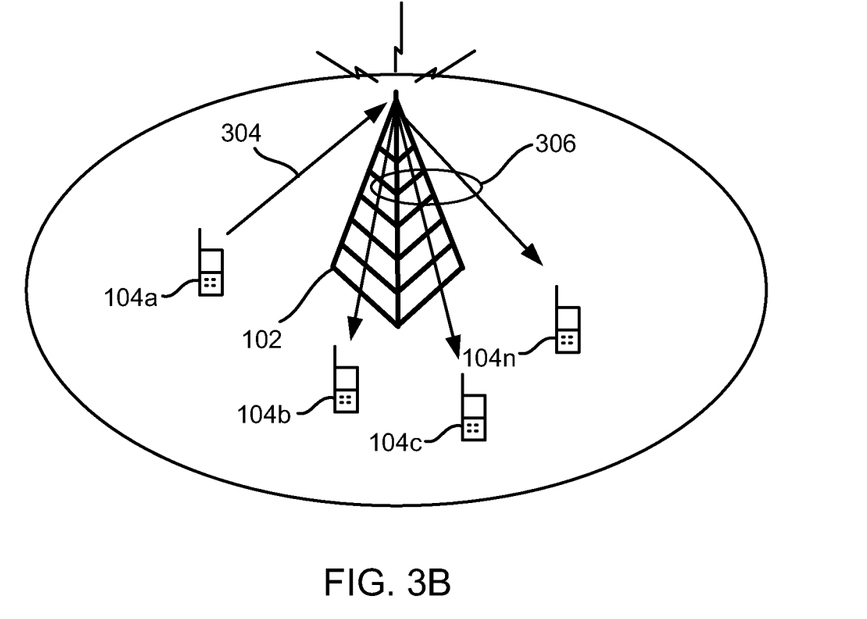

FIG. 3B illustrates the communication between eNodeB 102 and UEs 104a-104n in a LCG. In the example of FIG. 3B, one UE, for example, UE 104a, may request to transmit data 304 on the uplink. The UE 104a may request to transmit in the uplink using known procedures, for example, by transmitting a scheduling request on the physical uplink control channel (PUCCH) or by using the random access channel (RACH). Alternatively, UE 104a may also send a buffer status report (BSR) to eNodeB 102 indicating that the UE 104a has data to transmit to the group associated with the LCID/LCGID. When the eNodeB 102 receives the BSR, the eNodeB 102 may schedule UE 104a to transmit in the uplink.

After UE 104a has transmitted the data to eNodeB 102 in the uplink, eNodeB 102 may then multicast the data 306 to the remaining UEs (e.g., UEs 102b-102n) in the LCG. Multicast transmissions in the downlink may be identified by the group ID associated with the LCG. In one embodiment, the group ID may be a multicast cell radio network temporary identity (MC-RNTI) as described in more detail below. In some embodiments, UEs 104a-104n may be configured to provide confirmation of delivery data 306. For example, hybrid automatic repeat request (HARQ) level acknowledgements and non-acknowledgements may be enabled by eNodeB 102. Similarly, transmission control protocol (TCP) layer or application layer acknowledgements may be used.

Figure 4A:
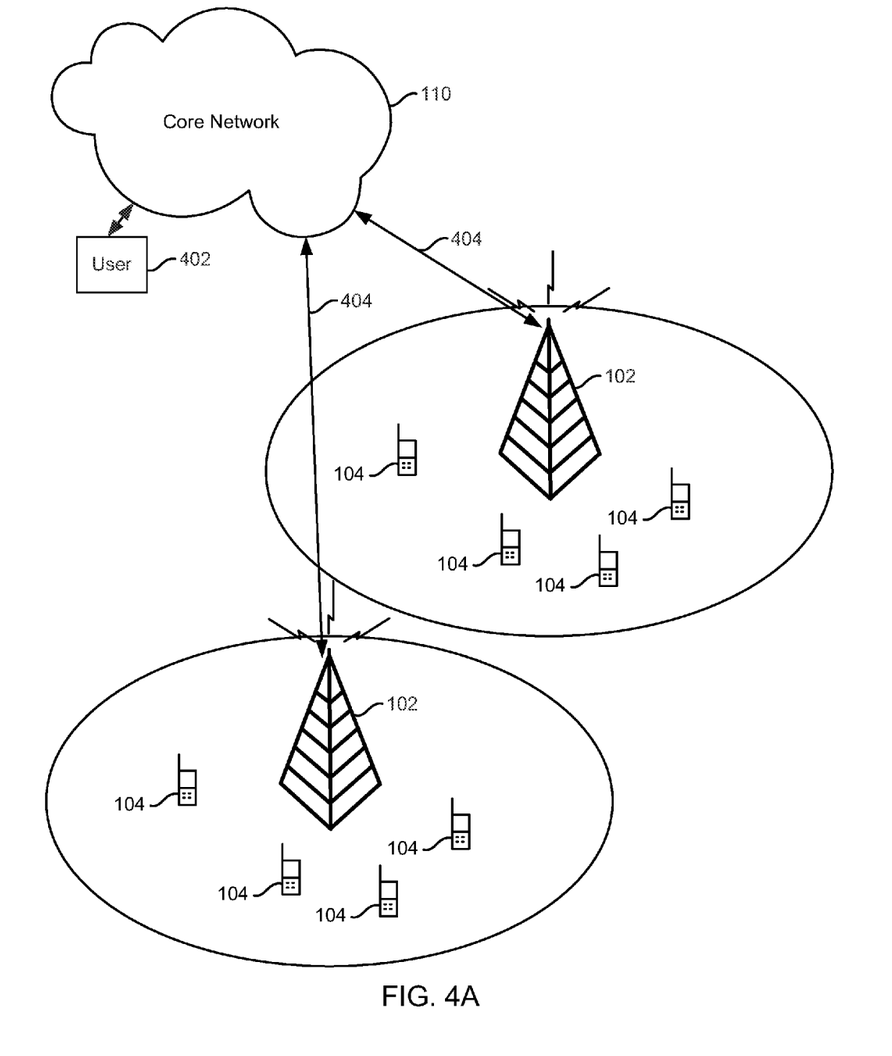
FIGS. 4A and 4B illustrate an example eNodeB implementing a network hosted local communication group.

FIG. 4 illustrates an example eNodeB implementing a network hosted local communication group. As shown in FIG. 4A, the network hosted LCG may be requested by a user 402 that is not local (e.g., in the area served by a single eNodeB). The group may be formed by invitation or by subscription (e.g., for use with machine type communications). In one embodiment, the core network 110 may associate a group ID with the request and distribute 404 the group ID to one or more eNodeBs in the radio access network (RAN) where each eNodeB reserves the group ID for the network hosted LCG. In another embodiment, each eNodeB may use a distinct group ID and associate the distinct group ID with a network group ID.

Figure 4B:
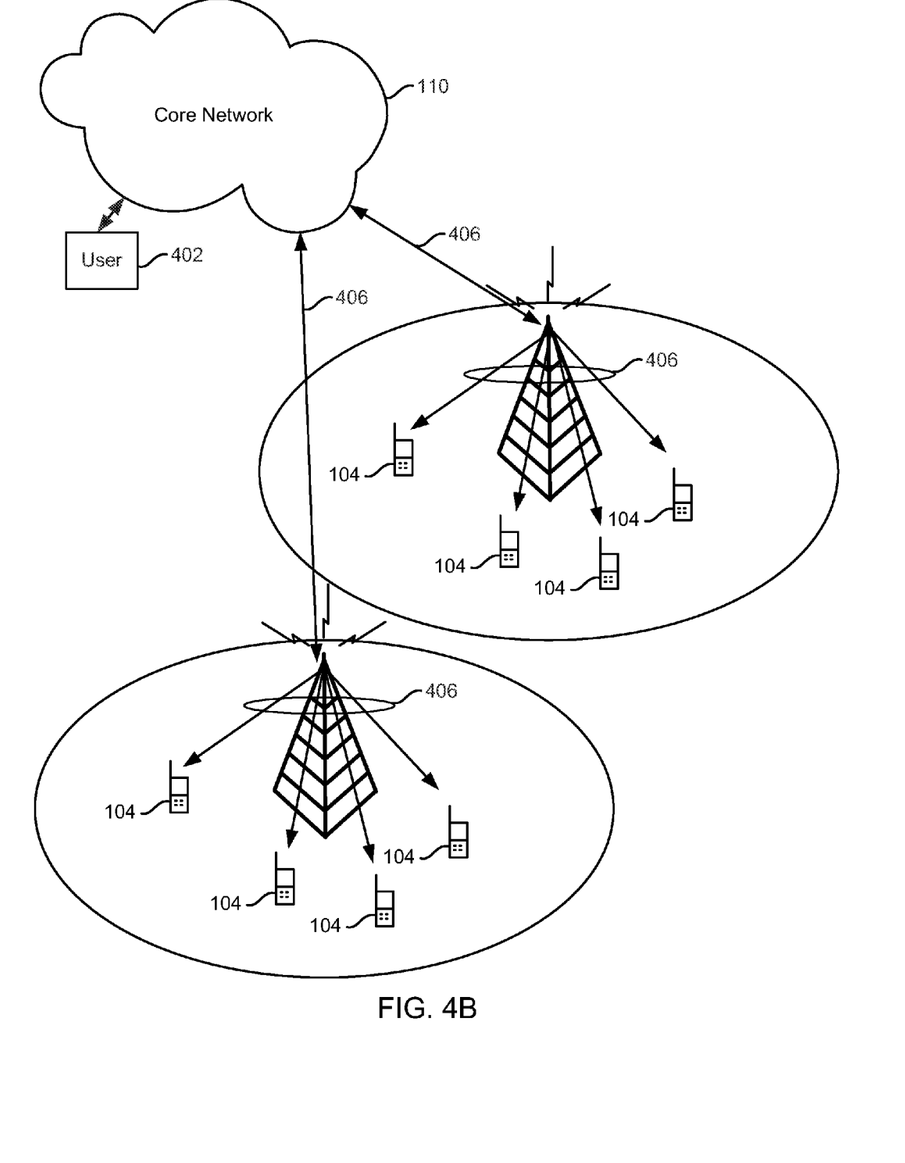

FIG. 4B illustrates a multicast downlink communication from one user 402 to the remaining users (e.g., UEs 104) in the LCG. If more than one eNodeB is involved in distributing the multicast transmission, the transmission might not be synchronized across those eNodeBs. In this case, each eNodeB may be responsible for scheduling transmission of the multicast data.

Figure 5:
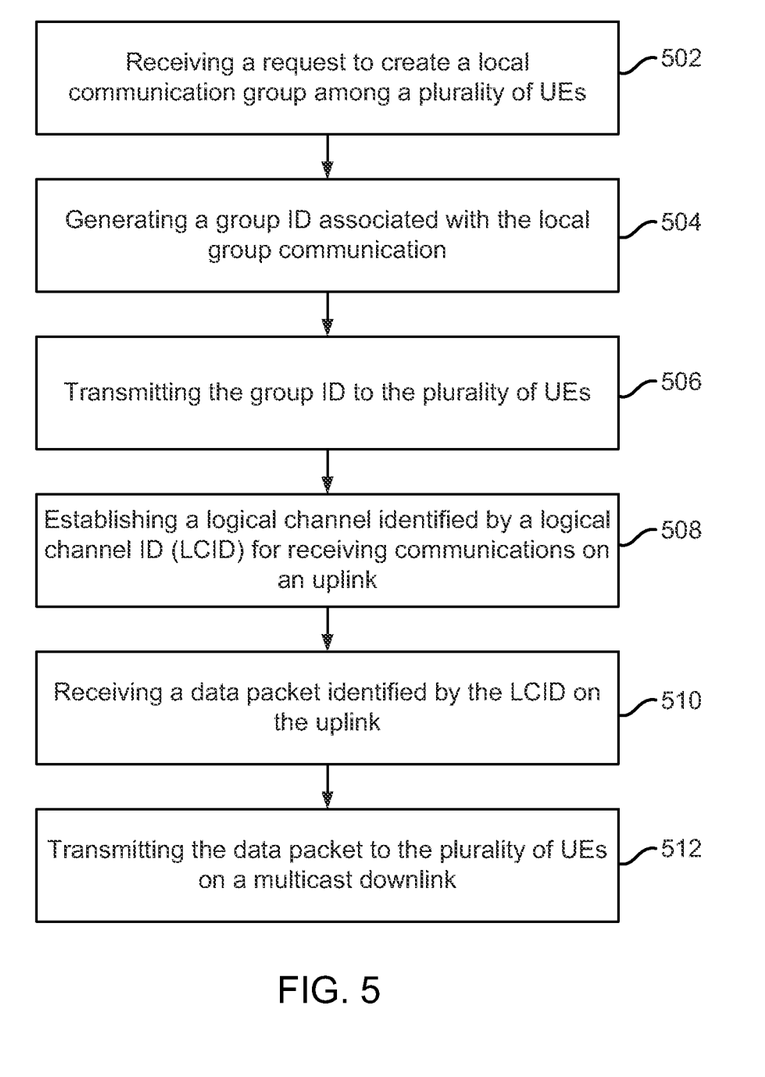
FIG. 5 is an example flow-diagram of communications in a local communication group.

FIG. 5 is an example flow-diagram of communications in a local communication group. The example of FIG. 5 begins at 502 with the eNodeB receiving a request from a user (e.g., UE 104a in the example of FIG. 3) to create a local communication group among a plurality of UEs. At 504, in response to receiving the request, the eNodeB generates a group ID associated with the LCG. The eNodeB may then transmit the group ID to the plurality of UEs at 506. The eNodeB, at 508, may establish a logical channel for uplink communication and associate the logical channel with an LCID. At 510, upon receiving data on an uplink communication associated with the LCID, the eNodeB, at 512, may transmit the data to the plurality of UEs on a multicast donwlink.

Figure 6A:
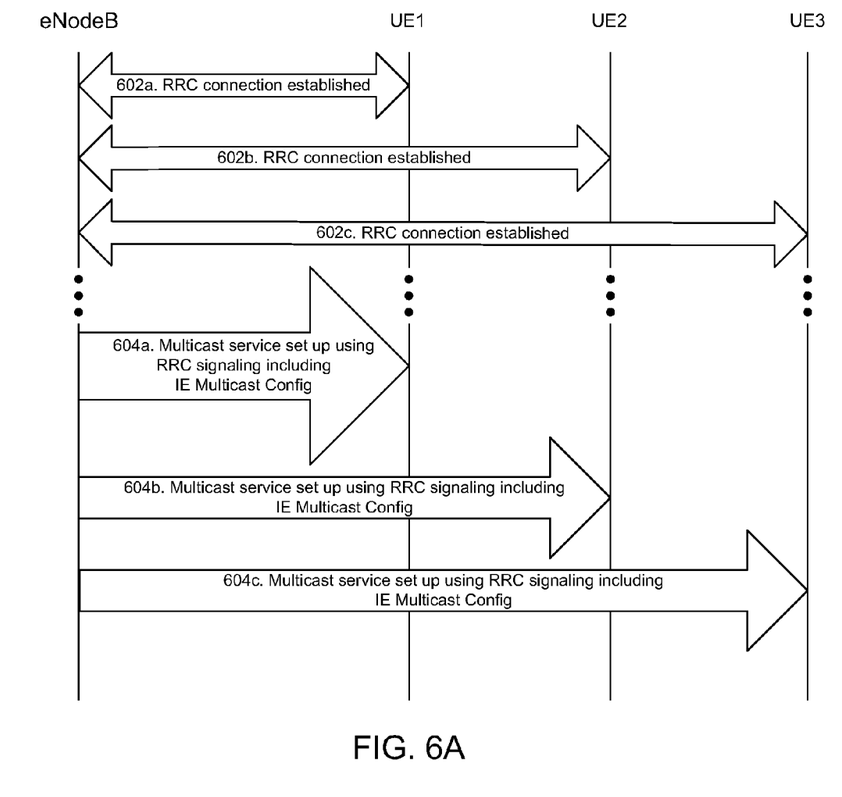
FIGS. 6A and 6B illustrate an example process for multicasting using an eNodeB.
Figure 6B:
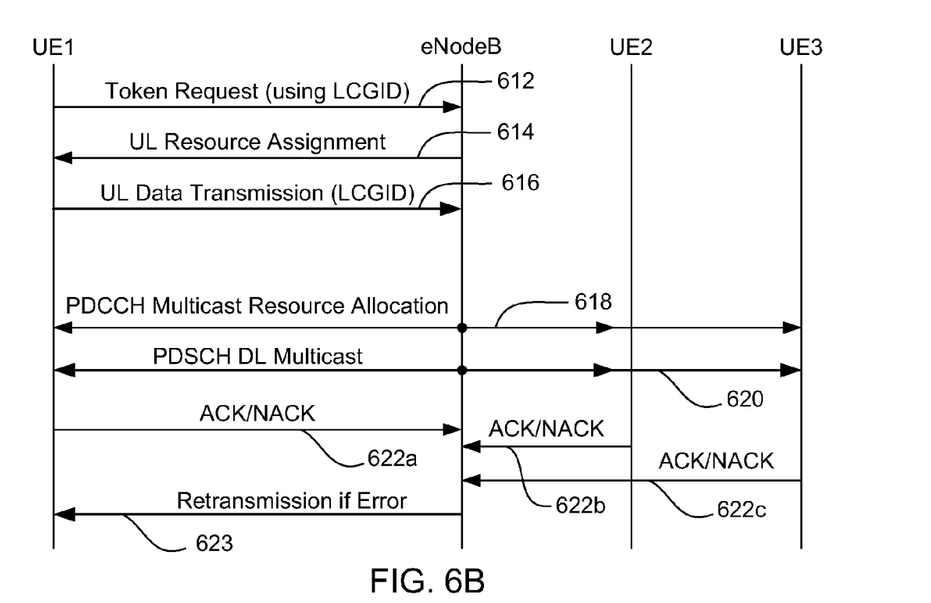

FIG. 6 illustrates an example process for multicasting using an eNodeB. For the multicast service, an eNodeB may use a control plane protocol, such as RRC, to establish a connection for each of the UEs in an LCG. The LCG can be serviced by a single eNodeB, or a combination of eNodeBs (e.g., in a network hosted LCG). The eNodeB may establish a multicast service on a plurality of UEs in a LCG using a multicast identifier as the group ID. In one embodiment, the multicast identifier may be a multicast cell radio network temporary identifier (MC-RNTI) with a common cell identifier (CID), but other identifiers can be used as well. As part of the setup of the multicast service, the eNodeB may notify each UE in the LCG of the group ID using an information element (IE) multicast configuration in RRC signaling.

The example of FIGS. 6A and 6B, more specifically, illustrates an example process for multicast servicing in a unicast subframe by an eNodeB to three mobile devices (UE1, UE2, and UE3). In FIG. 6A, the eNodeB may establish a RRC connection 602a, 602b, and 602c with each of the UEs in the LCG. Although three UEs are shown, any number of UEs can form a LCG. RRC signaling handles the control plane signaling via a Layer 2 communication link in advance of sending the physical downlink control channel (PDCCH) for a subframe. The RRC protocol and functions for a UE can include connection establishment and release, broadcast of system information, a radio bearer establishment/reconfiguration and release, RRC connection mobility procedures, paging notification and release, and/or outer loop power control consistent with 3GPP LTE or similar specification. One RRC connection may be open to a UE at any given time. RRC connection establishment can be used to make the transition from RRC idle mode to RRC connected mode. Each UE makes the transition to an RRC connected mode before transferring application data (such as browsing the internet, sending or receiving an email, or video conferencing), or completing signaling procedures. The RRC connection establishment procedure can be initiated by each UE but can be triggered by either the UE or the network. The RRC signaling can be transmitted via information elements (IE), such as an RRC connection setup message which can define configuration information for the physical downlink shared channel (PDSCH), PUCCH and physical uplink shared channel (PUSCH).

The eNodeB can define and configure the MC-RNTI for each LCG. A cell radio network temporary identifier (C-RNTI) allows the eNodeB to identify the UE and communicate directly with the UE. The MC-RNTI is a layer 2 group identifier allocated by the eNodeB and unique within one cell controlled by that eNodeB. The MC-RNTI can be reallocated when a UE moves to a new cell if multicast connections are to be handed over to the new cell. The eNodeB can notify each UE participating in the LCG of the MC-RNTI using RRC signaling. For example, the eNodeB can establish a multicast service using RRC signaling including IE multicast configuration 604a, 604b, and 604c on each of the UEs in the LCG. The IE multicast configuration can include the MC-RNTI.

In another example, the eNodeB can assign each UE a different PUCCH resource assignment $n_{PUCCH}^{(1,p)}$ for an acknowledgment/negative acknowledgment (ACK/NACK) feedback resource indication where n is a subframe number for a transmission of a HARQ-ACK on an antenna port p for a PUCCH format 1a/1b for frequency-division duplexing (FDD) or time-division duplexing (TDD) ACK/NACK feedback. The eNodeB can notify each UE in the LCG of its PUCCH resource assignment for the ACK or the NACK feedback resource indication using an IE PUCCH configuration in RRC signaling. In another example, the eNodeB can assign a different PUCCH resource for the ACK or the NACK feedback resource indication for a subset of UEs in the LCG based on a transmission quality factor, such as signal to interference plus noise ratio (SINR) below a predetermined level, or a level indicating a poor channel quality indicator (CQI) report, a poor preceding matrix indicator (PMI) report, or a poor transmission rank indicator (RI) report. Other transmission quality factors may also be used.

The eNodeB can dynamically allocate resources and transmit the PDSCH to each of the UEs (UE1, UE2, and UE3) in the LCG in a single transmission, which can be decoded by each of the UEs in the multicast. Details of the process for dynamically allocating the resources and transmitting the PDSCH to each of the UEs are shown in FIG. 6B. In this example, UE1 sends a token request (using LCGID in BSR) to the eNodeB to request resources for transmitting data intended for the group. The eNodeB responds by sending UL resource assignment 614 to UE1. Then, UE1 sends a UL data transmission 616 to the eNodeB to be broadcast to the group. The eNodeB responds by sending a PDCCH 618 for multicast resource allocation of the PDSCH. The PDCCH can be masked by the MC-RNTI. The MC-RNTI or C-RNTI can be used by the encoder or scrambler to allow the UEs to receive the transmissions intended for the UEs. Masking the PDCCH allows UEs with a matching MC-RNTI to decode the message. Data, such as a video conference call, can be transmitted via the PDSCH. After the multicast resource allocation, the eNodeB sends the PDSCH DL multicast 620 to the each of the UEs (UE1, UE2, and UE3) in the LCG.

At the UEs, each UE can blind detect (blind decode) the PDCCH using the previously configured MC-RNTI. For a multicast allocation example, each UE can decode the PDCCH and the PDSCH. In response to the PDSCH 620, when HARQ is enabled, each UE sends an ACK/NACK 620a, 620b, and 620c to the eNodeB. When ACK/NACK feedback is enabled, the eNodeB can retransmit 623 the message if a transmission error occurs. A transmission error may be indicated by the NACK feedback. Retransmission can be provided to all the UEs in the LCG or a subset of the UEs in the LCG based on some subset criteria, such as a transmission quality factor. For example, the eNodeB can send one or two retransmission depending the application's delay constraint. The retransmission can be sent using either a unicast or multicast transmission. In another example, ACK/NACK feedback may not be enabled and no retransmission of the message may occur.

For a single cell example, the eNodeB can transmit and/or retransmit the multicast service data using either cell specific reference signals (CRS) or UE-specific reference signals (UE-R) demodulation reference signal (DMRS). For a multiple cell or multi-cell example, the eNodeB can transmit and/or retransmit data using either CRS or UE-RS (DMRS). If CRS is used, the CRS interlace may be disabled. The CRS interlace can cell-specific frequency shift the CRS and/or data by a $v_{shift}$ that applies to a specific cell and cell number. Since multiple cells may be used, the CRS interlace may not apply to multicast service in multiple cells. An interlacer can perform the CRS interlace. For a multiple cell or multi-cell example, the plurality of eNodeBs can have a similar configuration of RLC, MAC, and/or PHY layers for the multicast service, so the multi-cell transmission can have synchronized radio frame timing with the same system frame number (SFN) or coordinated radio frame timing.

Additional ACK/NACK feedback and HARQ re-transmission options may be used when the number of users involved in the LCG is large, in addition to the options already discussed. In an example, the eNodeB may enable ACK/NACK and HARQ re-transmission for a subset of users based on some criteria, such as reported radio resource management (RRM) measurements. In another example, the ACK/NACK may be disabled, which may be similar to the MBMS framework. An MBMS transmission does not use the ACK/NACK feedback. The MBMS framework may not use blind HARQ repetitions or RLC quick repeat.

The multicast service using a unicast subframe can be more efficient and provide more reliability than either the MBMS in dedicated MBSFN subframe, or the unicast service in the unicast subframe. Neither the MBMS nor unicast service may be efficient in supporting a small group of multicast users, such as a small office, who want reliable transmission, which can be provided by ACK/NACK feedback.

Figure 7:
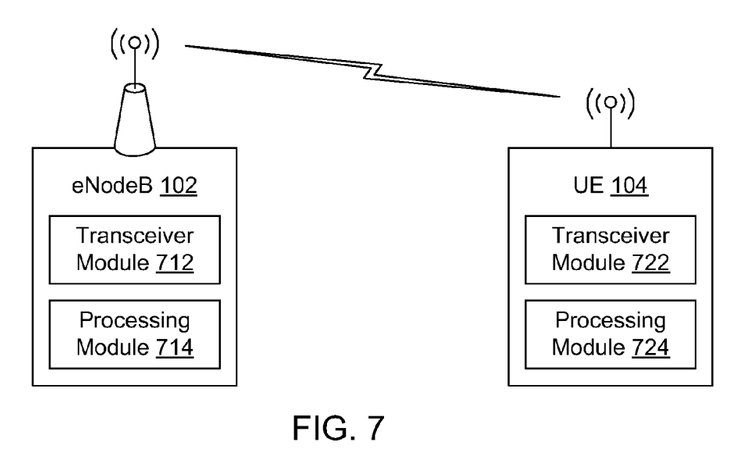
FIG. 7 illustrates an example eNodeB and an example UE according to certain embodiments.

FIG. 7 illustrates an example eNodeB 102 and an example UE 104 according to certain embodiments. The eNodeB 102 can include a processing module 714 and a transceiver module 712. The processing module 714 of the eNodeB can generate an MC-RNTI for a multicast service for UEs in an LCG. The transceiver module 712 of the eNodeB can transmit the MC-RNTI to the UEs, receive a data packet in a UL message from one of the UEs, and multicast the data packet to the UEs in the LCG. The UE 104 can include a processing module 724 and a transceiver module 722. The processing module 724 of the UE can configure the UE as a host or a participant of the LCG. The transceiver module 722 of the UE 104 can receive configuration data from the eNodeB 102 corresponding to the LCG, transmit a request to the eNodeB to transmit data to the LCG, and receive data in a multicast downlink corresponding to the LCG.

Figure 8:
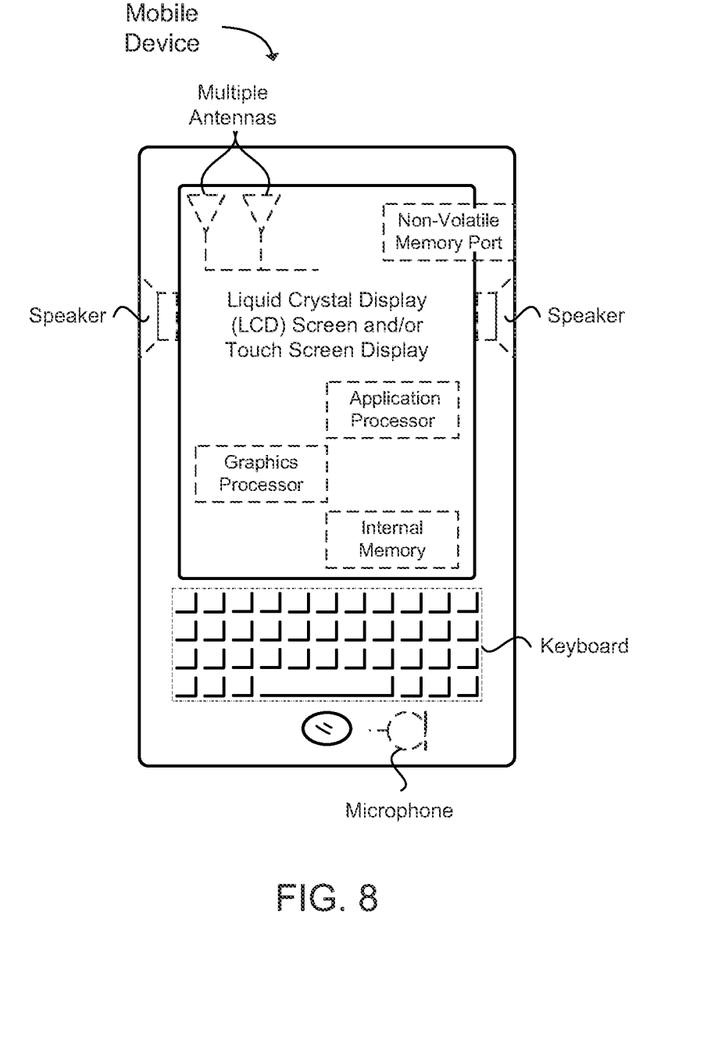
FIG. 8 provides an example illustration of a mobile device according to certain embodiments.

FIG. 8 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

What is claimed is:

1. An evolved node B (eNodeB) for an evolved universal terrestrial radio access network, the eNodeB comprising:

a processor; and a memory coupled with the processor, the memory storing instructions which when executed by the processor cause the eNodeB to:

generate a group identifier (ID) associated with a plurality of user equipments (UEs), wherein the group ID includes a multicast cell radio network temporary identifier (MC-RNTI) configured for the plurality of UEs;

receive, from a first UE of the plurality of UEs, a data packet for multicasting to the plurality of UEs; and transmit the data packet to the plurality of UEs on a multicast downlink resource, wherein an assignment of the multicast downlink resource is provided to the plurality of UEs using the MC-RNTI.

2. The eNodeB of claim 1, wherein the plurality of operations further cause the eNodeB to establish a logical channel for receiving communications on an uplink from the first UE, the uplink established using unicast resources, and the logical channel identified by a logical channel identifier (LCID) and a logical channel group identifier (LCGID), and wherein the data packet is received from the first UE on the uplink and is associated with the LCID and the LCGID.

3. The eNodeB of claim 2, wherein the plurality of operations further cause the eNodeB to maintain a data structure configured to associate the LCID and the LCGID with each of the plurality of UEs and the group ID.

4. The eNodeB of claim 1, wherein the eNodeB is configured to receive, on a physical uplink control channel (PUCCH), a request from a second UE to transmit data on an uplink for multicasting by the eNodeB to the plurality of UEs.

5. The eNodeB of claim 1, wherein the eNodeB is configured to receive, on the random access channel (RACH) using a per UE or per group designated preamble, a request from a second UE to transmit data on an uplink for multicasting by the eNodeB to the plurality of UEs.

6. The eNodeB of claim 1, wherein the eNodeB is configured to receive, via a buffer status report (BSR) using a logical channel group identifier (LCGID) associated with the group communication, a request from a second UE to transmit data on an uplink for multicasting by the eNodeB to the plurality of UEs.

7. The eNodeB of claim 1, wherein the eNodeB is configured to:

generate the group ID in response to a request to create a local communication group (LCG) including the plurality of UEs, the request including quality of service (QoS) related information; and assign a proper QoS Class Identifier (QCI) to the LCG based on the QoS related information.

8. The eNodeB of claim 7, wherein the request to create the LCG is received from a group owner and management entity through a core network.

9. The eNodeB of claim, 7 wherein the request to create the LCG is received from a UE of the plurality of UEs.

10. A method for implementing enhanced local communication in a third-generation partnership project (3GPP) network by an evolved node B (eNodeB), comprising:

receiving a request to configure a local communication group (LCG) among a plurality of user equipments (UEs);

in response to the request, establishing one or more logical channels for receiving communications on corresponding uplinks from at least one of the plurality of UEs, wherein the uplinks are established using unicast resources and the one or more logical channels are identified by respective logical channel identifiers (LCIDs) and logical channel group identifiers (LCGIDs) and generating a group identifier (ID) associated with the LCG; and transmitting the group ID to the plurality of UEs, wherein the group ID comprises a multicast cell radio network temporary identifier (MC-RNTI); and multicasting, to the LCG, communications received on the uplinks that include one of the LCIDs and one of the LCGIDs.

11. The method of claim 10, wherein multicasting comprises transmitting the communications to the plurality of UEs on a multicast downlink using the group ID.

12. The method of claim 10, further comprising:

maintaining a data structure configured to associate the LCIDs and the LCGIDs with respective UEs of the plurality of UEs.

13. The method of claim 10, further comprising:

receiving a request on a physical uplink control channel (PUCCH) to transmit data for the LCG on one of the uplinks.

14. The method of claim 10, further comprising receiving a request on a random access channel (RACH) to transmit data for the LCG on one of the uplinks.

15. The method of claim 10, further comprising receiving a request via a buffer status report (BSR) to transmit data for the LCG on one of the uplinks.

16. A user equipment (UE), comprising:

a processing module to selectively configure the UE as a host or a participant of a local communication group (LCG); and a transceiver module to:

receive configuration data from an evolved Node B (eNodeB) corresponding to the LCG;

transmit a request to the eNodeB to transmit data to the LCG, wherein the configuration data comprises: a group identifier (ID) associated with the LCG; and a logical channel identifier (LCID) and a logical channel group identifier for use in uplink communications associated with the LCG, wherein the group ID comprises a multicast cell radio network temporary identifier (MC-RNTI); and receive data in a multicast downlink corresponding to the LCG.

17. The UE of claim 16, when operating as the host, the transceiver module is configured to:

transmit a request to the eNodeB to configure the LCG among a plurality of UEs; and transmit on a unicast uplink resource a data packet to be distributed to the plurality of UEs on the multicast downlink.

18. The UE of claim 17, when operating as the host, the transceiver module is configured to:

transmit an invitation to the join the LCG to the plurality of UEs, wherein the invitation includes the group ID.

19. The UE of claim 16, when operating as the participant, the transceiver module is configured to:

receive an invitation to join the LCG, wherein the invitation includes a multicast cell radio network temporary identifier (MC-RNTI) configured for the LCG, and a logical channel identifier (LCID) and a logical channel group identifier (LCGID) associated with a unicast resource for uplink communications with the LCG;

transmit an uplink data packet to be distributed to the LCG, wherein the uplink data packet is identified as being associated with the LCG by including the LCID in a medium access control (MAC) header; and receive a downlink data packet on a multicast downlink resource, wherein the corresponding multicast resource is associated with the MC-RNTI configured for the group.

20. The UE of claim 16, the processing module further configured to:

confirm, to the eNodeB, receipt of the data in the multicast downlink corresponding to the LCG.

21. The UE of claim 20, wherein processing module is configured to confirm receipt of the data in the multicast downlink using a hybrid automatic repeat request (HARQ) level acknowledge/negative-acknowledge procedure.

22. The UE of claim 20, wherein processing module is configured to confirm receipt of the data in the multicast downlink using a transmission control protocol (TCP) level acknowledge/negative-acknowledge procedure.

* * * * *

UNITED STATES PATENT AND TRADEMARK OFFICE
CERTIFICATE OF CORRECTION

PATENT NO. : 8,811,258 B2
APPLICATION NO. : 13/719372
DATED : August 19, 2014
INVENTOR(S) : Kamran Etemad et al.

Page 1 of 1

It is certified that error appears in the above-identified patent and that said Letters Patent is hereby corrected as shown below:

In the Claims

In column 9, line 54, in claim 9, delete "claim, 7" and insert -- claim 7, --, therefor.

In column 10, line 3, in claim 10, delete "plurity" and insert -- plurality --, therefor.

Signed and Sealed this
Eleventh Day of November, 2014

Michelle K. Lee
*Deputy Director of the United States Patent and Trademark Office*